United States Patent [19]

Guzik et al.

[11] Patent Number: 4,929,062
[45] Date of Patent: May 29, 1990

[54] LIGHT GUIDE FOR LCD

[75] Inventors: Andrzej T. Guzik, Pompano Beach; James H. Curtis, Coral Springs; Faris S. Habbaba, Boca Raton; Kirit Shah, Coral Springs, all of Fla.

[73] Assignee: Motorola, Inc., Schaumburg, Ill.

[21] Appl. No.: 265,977

[22] Filed: Nov. 2, 1988

[51] Int. Cl.⁵ ................................. G02F 1/13
[52] U.S. Cl. ..................... 350/345; 362/31; 362/297
[58] Field of Search ............ 350/345, 338, 342, 96.12; 362/31, 297

[56] References Cited

U.S. PATENT DOCUMENTS

| | | | |
|---|---|---|---|
| 4,118,111 | 10/1978 | Laesser | 350/345 X |
| 4,258,643 | 3/1981 | Ishikawa et al. | 362/26 X |
| 4,282,560 | 8/1981 | Kringel et al. | 362/31 X |
| 4,630,895 | 12/1986 | Abdala, Jr. et al. | 350/345 |
| 4,714,983 | 12/1987 | Lang | 350/345 X |
| 4,755,035 | 7/1988 | Kopish et al. | 350/345 |
| 4,770,499 | 9/1988 | Kobayashi et al. | 350/345 |

Primary Examiner—John S. Heyman
Assistant Examiner—Napoleon Thantu
Attorney, Agent, or Firm—Daniel K. Nichols; Robert S. Babayi

[57] ABSTRACT

A display system includes a liquid crystal display, a light guide behind the display, and light emitting diodes. The light guide is a molded slab of clear material with a front display surface a rear surface and six bordering surfaces with two planes depressed into its rear surface and having two hollow half cylindrical extensions integrally molded with closed top and bottom ends. The rear surface and bordering surfaces and outer surface of the extensions are coated with reflective white paint. These extensions receive light from surface mounted LED's which are positioned directly below the extensions to redirect the light into the light guide.

5 Claims, 3 Drawing Sheets

LIGHT GUIDE FOR LCD

BACKGROUND OF THE INVENTION

This invention relates to the field of display systems and more particularly to backlighted liquid crystal display (LCD) systems. LCD's consume significantly lower power than Light Emitting Diodes (LED's) therefore, they are widely used in units where power consumption is critical, such as battery operated watches, calculators, and portable radio devices. However, LCD's require light for illumination since they merely reflect or absorb light emitted from other sources. The prior art backlighting system provides a uniform backlight by utilizing a light guide which is positioned behind the liquid crystal display.

A prior art light guide 100 is illustrated in FIGS. 1 and 2. The light guide normally is made from a slab of transparent plastic material, substantially uniform in thickness. The slab has a front surface 102, a rear surfaces 104 and six bordering surfaces 106, 108, 110, 112, 114, and 116, perpendicular to the front and rear surfaces. Two of the bordering surfaces 106, 108 are mutually parallel and are located at opposite ends of the slab. The remaining four bordering surfaces 110, 112, 114, 116 are arcuate in shape. The rear surface 104 has two rectangular planes 144, 146 depressed into it.

Light sources such as LED's 122, 124 are located adjacent to each of the parallel surfaces 106, 108. Light source holders 156,158 are basically half cylindrically shaped notches, integrally molded into the parallel surfaces 106 and 108 along their vertical axis, and are open at the top and bottom. The shape of the light holders 156, 158 depends on the size of the particular light source used and may have notches 168, 170, 172, 174 cut into the sides of the holder to allow bending of the leads of the light source.

A reflective coating covers the rear surface 104 and the bordering surfaces 106, 108, 110, 112, 114, 116. The light source holders 156, 158, notches, or inner wall surface 118, 120, and the section of front surface 102 adjacent to the liquid crystal display surface remains transparent.

In operation, light emitted from the light sources 122,124 enters the light guide 100 through the transparent notches inner wall surfaces 118, 120 and gets reflected to the clear front surface 102 resulting in substantially uniform illumination of the liquid crystal display. The light emitted from the light sources 122,124 enters the light guide directly through transparent section of side surfaces 106, 108 substantially parallel to the front and rear surfaces 102,104. A complete detailed description of this type light guide is given in U.S. Pat. No. 4,630,895, the disclosure of which is hereby incorporated by reference as if fully set out herein.

With this known approach the light source is positioned in the exposed area 156,158 therefore some of the intensity of the light source is lost. Furthermore, using leaded components as light source presents several manufacturing related problems concerning soldering and automation. Particularly, if a leaded light source is soldered and then is subjected to a solder reflow process (a preferred soldering process in automated manufacturing environments) the previously soldered leaded component is exposed to high temperature which can cause unreliable solder connections and possible component failure.

SUMMARY OF THE INVENTION

It is an object of the invention to provide an improved backlighted liquid crystal display system.

It is another object of the invention to efficiently capture and reflect the emitted light from the light source into the light guide.

It is another object of the invention to facilitate the manufacturing process of the backlighted crystal display system by providing the means for utilization of components designed for automated manufacturing.

It is still another object of the invention to receive light which is emitted perpendicular to the light guide and redirect the light into the light guide.

A light guide display system includes a liquid crystal display, a light source, and a light guide. The light guide has a display surface positioned behind the LCD and includes a generally concave extension. The extension is positioned over the light source for receiving light and directing it to the display surface.

In one aspect of the invention, the extension is formed in a half barrel shape providing a hollow half cylindrical geometry with closed top and bottom end surfaces.

DESCRIPTION OF THE PREFERRED EMBODIMENT

Figure 1:
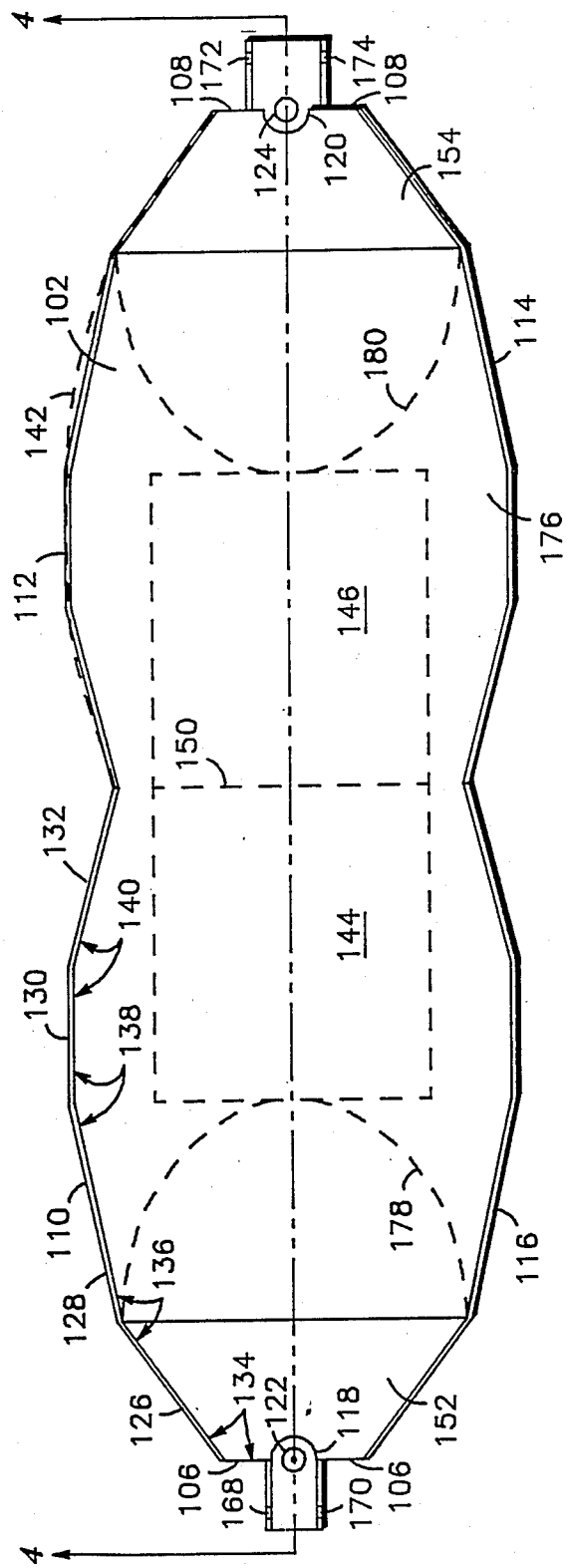
FIG. 1 is a plane view of the front surface of a prior art light guide
Figure 2:
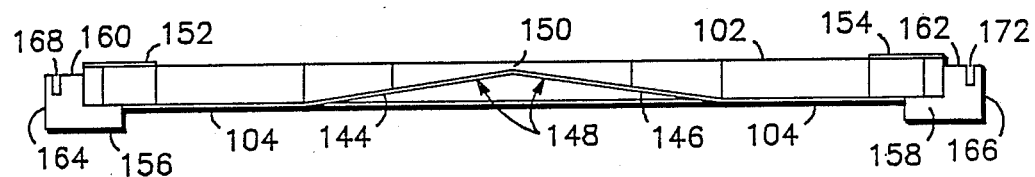
FIG. 2 is a sectional view of the light guide of FIG. 1 taken along the line 4—4 of FIG. 1.
Figure 3:
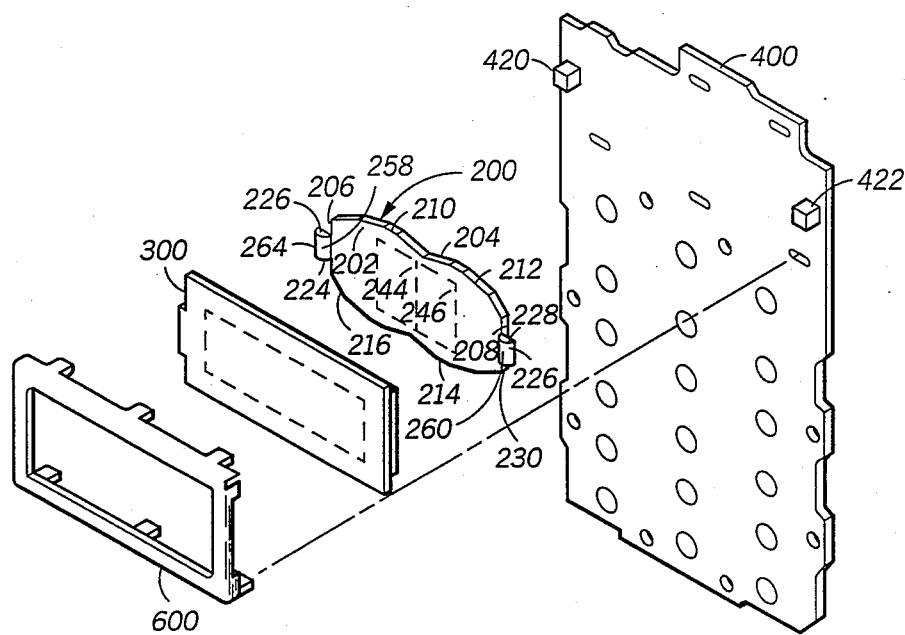
FIG. 3 is an exploded view of a light guide assembly in accordance with the present invention.
Figure 4:
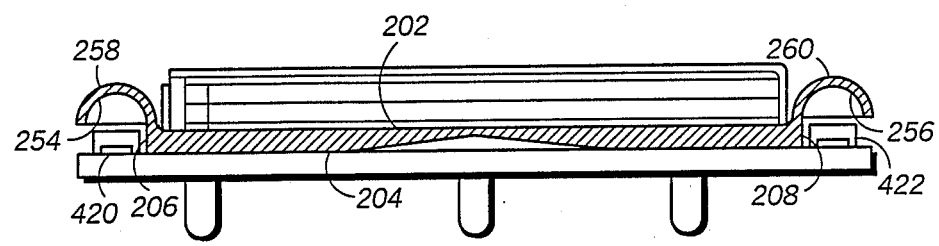
FIG. 4 is a cross-sectional view of the assembled light guide of FIG. 3.

Referring first to FIG. 3, a backlighted liquid crystal display system comprises a light guide 200 located directly behind a LCD 300 and contained by a bezel 600 which can be mounted to the surface of a printed circuit board 400 carrying light sources 420 and 422.

The light guide 200 is preferably made from a slab of transparent plastic material substantially uniform in thickness as is discussed in U.S. Pat. No. 4,630,895. The light guide 200 has a front surface 202 (also referred to as a display surface), a rear surface 204 and six bordering surfaces 206, 208, 210, 212, 214, 216 perpendicular to the front and rear surface. Two of the bordering surfaces 206 and 208 are mutually parallel and are located at opposite ends of the light guide 200. The remaining four bordering surfaces 210, 212, 214, 216 are arcuate in shape. The rear surface has two rectangular planes 244, 246 depressed into it. Two "half barrel" shaped extensions 264 and 266 are integrally molded at the opposite ends 206 and 208 of of the light guide 200 extending from the front surface 202. The half barrel extensions 264 and 266 each form a hollow half cylindrical shape with closed top and bottom end surfaces 224, 226, 228, 230. While the extensions of the preferred embodiment are hollow half cylindrical with closed top and bottom ends, these cavity extensions can be of other generally concave shapes such as spherical, cubic, pyramidal, or other polygonal shape.

A reflective coating covers the rear surface 204, the bordering surfaces 210, 212, 214, 216 and the outer walls 258, 260, 224, 226, 228, 230 of half barrelled extensions. The inner walls 254, 256 of the half barrelled extensions, the side parallel surfaces 206, 208 and the front surface area 202 adjacent to liquid crystal display remain transparent.

The light from the light sources 420 and 422, which comprise surface mounted LED's, is emitted directly upward or perpendicular to the light guide 200. The light guide cavity extensions 264 and 266 are positioned directly above the LED's 420 and 422, covering them, but are not directly connected to or in contact with the LED's. The light emitted by the light sources 420 and 422 hits the inner surfaces 254 and 256 of extensions 264 and 266 and is almost entirely reflected to the transparent side surfaces 206 and 208, thereby entering the light guide 200. The extensions 264 and 266 act as means for capturing the light and directing it to the transparent side surfaces 206 and 208. The light is then emitted substantially evenly from the transparent section of the front surface 202 thereby illuminating the liquid crystal display 300.

The use of surface mounted LED's as light source in the preferred embodiment, facilitates automated manufacturing of the assembly. The concave extensions 260 and 264 receive the light from the surface mounted LED's for illuminating the LCD 300..

We claim as our invention:

1. A liquid crystal display system, comprising in combination:
   a liquid crystal display;
   two surface mounted light sources, and
   a light guide having a display surface positioned behind said liquid crystal display, said light guide is made from a slab of transparent plastic material substantially uniform in thickness having a front surface adjacent said crystal liquid display, a rear surface, and six bordering surfaces perpendicular to said front and rear surface, two of the bordering surfaces are substantially mutually parallel and are located at opposite ends of the slab, the other four bordering surfaces are substantially arcuate in shape, said rear surface has two rectangular plane depressions;
   two generally half barrel shaped concave extensions, positioned over said light sources, being carried by said ends for receiving light emitted by said light sources, substantially perpendicular to the light guide and directing it into said light guide, said arcuate bordering surface, said rear surface, and said depressed planes including the means for reflecting light.

2. The display system of claim 1 wherein said two surface mounted light sources are light emitting diodes.

3. The display system of claim 1 wherein said means for reflecting light comprise white paint 4. A light guide having a display surface made from a slab of transparent plastic material substantially uniform in thickness having a front, and a rear surface, and six bordering surfaces perpendicular to said front and rear surface, two of the bordering surfaces are substantially mutually parallel and are located at opposite ends of the slab, the other four bordering surfaces are substantially arcuate in shape, said rear surface has two rectangular plane depressions;
   two generally half barrel shaped concave extensions being carried by said ends for receiving light, substantially perpendicular to the light guide and directing it into said light guide, said arcuate bordering surface, said rear surface, and said depressed planes including means for reflecting light.

5. The light guide of claim 4 wherein the reflective means comprise white paint.

* * * * *